United States Patent
Maeda et al.

(10) Patent No.: US 7,471,888 B2
(45) Date of Patent: Dec. 30, 2008

(54) IMAGE PICKUP DEVICE AND PORTABLE ELECTRONIC EQUIPMENT

(75) Inventors: Fuyuhiko Maeda, Saitama (JP); Akihisa Yamazaki, Saitama (JP)

(73) Assignee: Fujifilm Corporation, Tokyo (JP)

( * ) Notice: Subject to any disclaimer, the term of this patent is extended or adjusted under 35 U.S.C. 154(b) by 395 days.

(21) Appl. No.: 11/481,970

(22) Filed: Jul. 7, 2006

(65) Prior Publication Data
US 2007/0009247 A1 Jan. 11, 2007

(30) Foreign Application Priority Data
Jul. 7, 2005 (JP) .............................. 2005-199138

(51) Int. Cl.
G03B 17/00 (2006.01)
G03B 17/04 (2006.01)
H04B 1/38 (2006.01)
H04M 1/00 (2006.01)
G02B 17/00 (2006.01)

(52) U.S. Cl. .................... 396/72; 396/348; 455/90.3; 455/550.1

(58) Field of Classification Search ............... 396/72, 396/428, 429; 455/90.3, 550.1; 359/726
See application file for complete search history.

(56) References Cited

U.S. PATENT DOCUMENTS

| 2003/0064688 A1 | 4/2003 | Mizuta et al. ................. 455/90 |
| 2003/0171133 A1 | 9/2003 | Mizuta et al. ................ 455/550 |
| 2008/0068730 A1* | 3/2008 | Matsui et al. ................ 359/726 |

FOREIGN PATENT DOCUMENTS

| JP | 2003-179678 A | 6/2003 |
| JP | 2003-204383 A | 7/2003 |
| JP | 2004-007117 A | 1/2004 |

* cited by examiner

Primary Examiner—Melissa J Koval
(74) Attorney, Agent, or Firm—Sughrue Mion, PLLC

(57) ABSTRACT

A cellular telephone handset has a built-in image pickup device. A lid shaped reception unit is slidable on a transmission unit or main body between closed and open positions, lies on a first surface of the main body when in the closed position, and uncovers at least part of the first surface when in the open position. An image sensor to pick up an image is contained in the main body. A first lens element receives object light incident thereon. Plural second lens elements in the main body have an optical axis extending in a sliding direction of the lid shaped reception unit, for introducing the object light to the image sensor. A path bending prism introduces the object light to the second lens elements by changing an optical path of the object light from the first lens element. An optical path length of the second lens elements is changeable.

17 Claims, 11 Drawing Sheets

IMAGE PICKUP DEVICE AND PORTABLE ELECTRONIC EQUIPMENT

BACKGROUND OF THE INVENTION

1. Field of the Invention

The present invention relates to an image pickup device and portable electronic equipment. More particularly, the present invention relates to an image pickup device having a zooming construction to photograph an image with a changeable magnification, and portable electronic equipment.

2. Description Related to the Prior Art

A camera device or camera module has been developed recently, and has a reduced size and is produced at a low cost. An image sensor in the camera device detects object light focused by an optical system. The camera device is combined with portable electronic equipment, such as a personal computer, electronic notebook and a cellular telephone handset. The cellular telephone handset of a built-in type having the camera device has been widely used.

JP-A 2004-007117 discloses a slidable protector or cover used in a known structure of the cellular telephone handset of the camera built-in type. A photographing opening is closed in an openable manner by the protector or cover in front of a photographing optical system for the purpose of protection and neat appearance of the front. A user must open and close the protector or cover manually. Much manual operation is required before or after the use for image pickup.

One camera built-in type of the cellular telephone handset is a sliding type commercially available, and includes a transmission unit or main body and a reception unit. A front surface of the transmission unit has a main key pad unit. A display panel or LCD panel is disposed on the front of the reception unit. The reception unit is kept slidable on the transmission unit in a form of setting a rear cover of the reception unit on a front cover of the transmission unit. The reception unit, when not in use, is slid to a closed position where the reception unit is set on a front face of the transmission unit, and when in use, is slid to an open position where the main key pad of the transmission unit is uncovered.

In the sliding type of the cellular telephone handset, the camera device is incorporated in one of the transmission and reception units. The photographing opening is formed in the rear of the reception unit or front of the transmission unit or main body. See U.S. Ser. No. 2003/064688 (corresponding to JP-A 2003-179678) and U.S. Ser. No. 2003/171133 (corresponding to JP-A 2003-204383). When the reception unit is moved to the closed position, the photographing opening is closed by one of the transmission and reception units opposed to the photographing opening. When the reception unit is moved to the open position, the photographing opening can be open. The photographing opening can be open and closed by sliding the reception unit. It is unnecessary to add a sliding type of the protector or cover of JP-A 2004-007117 in the cellular telephone handset.

There are conceptions of adding an optical zoom structure, a macroscopic photographing structure and the like to the cellular telephone handset of the sliding type with trends of designing high performance of the cellular telephone handset of the camera built-in type. A zoom lens movable in an optical axis direction must be used in the photographing optical system. On the other hand, a shape of the cellular telephone handset has a reduced size and a reduced thickness for the purpose of high portability. If the photographing opening is formed in a rear of the reception unit or the front of the transmission unit or main body as disclosed in U.S. Ser. No. 2003/064688 (corresponding to JP-A 2003-179678) and U.S. Ser. No. 2003/171133 (corresponding to JP-A 2003-204383), a movable range of the zoom lens is restricted because the optical axis direction of the photographing optical system is the same as the thickness direction of any of the transmission and reception units. It is difficult to raise the zooming magnification. A degree of freedom of zooming cannot be great for a user. Also, the macroscopic photographing structure for the purpose of macroscopic photography must be added to the camera device. This will raise the thickness of one of the transmission and reception units containing the camera device.

If high zooming magnification is desired for image pickup, one of the transmission and reception units containing the camera device is required to have a great thickness in order to keep a large movable range of the zoom lens. However, portability of the cellular telephone handset will be low because of a greater size of the cellular telephone handset of the sliding type.

SUMMARY OF THE INVENTION

In view of the foregoing problems, an object of the present invention is to provide an image pickup device having a zooming construction to photograph an image with a changeable magnification, and portable electronic equipment.

In order to achieve the above and other objects and advantages of this invention, an image pickup device includes a main body. A lid structure is slidable on a first surface of the main body between closed and open positions, positioned to lie on the first surface when in the closed position, and positioned to uncover at least part of the first surface when in the open position. An image sensor is incorporated in the main body, for picking up an image. A first optical system has a first optical axis extending erectly from the first surface, for receiving object light incident thereon. A second optical system has a second optical axis extending substantially in parallel with the first surface, for introducing the object light to the image sensor. A path bending optical element introduces the object light to the second optical system by changing an optical path of the object light from the first optical system. An optical system container is extendable according to sliding of the lid structure, for containing the first and second optical systems and the path bending optical element, for entering the main body when the lid structure is in the closed position, to decrease an optical path length of the second optical system, and for protruding from the main body when the lid structure is in the open position, to increase the optical path length of the second optical system.

The optical system container includes a first barrel, supported on the lid structure, for containing the first optical system and the path bending optical element. A second barrel is extendable in a sliding direction, for containing the second optical system.

The first barrel includes a photographing opening, directed to an object side, for introducing the object light to the first optical element. The lid structure is positioned opposite to the object side with respect to the main body.

The first barrel has first and second ends, the first end has the photographing opening, and the second end is secured to a surface of the lid structure opposed to the main body.

When the lid structure is in the closed position, the first barrel is contained in the main body to close the photographing opening.

The at least one second optical element is constituted by at least first and second movable lens elements which are positioned in respectively first and second lens holders. Furthermore, first and second lens shifters cause respectively the first and second lens holders to move the first and second movable lens elements in the sliding direction.

The second barrel includes a stationary container sleeve disposed stationarily. At least one movable container sleeve is contained in the stationary container sleeve movably in the sliding direction, for containing the at least one second optical element.

The first movable lens element is adapted to zooming.

Each of the first and second lens shifters includes a nut portion formed on the first or second lens holder. A screw portion rotates when the lid structure is in the open position, to cause the nut portion to move the first or second movable lens element.

Furthermore, a sliding cutout is formed in each of the first and second lens holders, and positioned differently from the nut portion. The first and second lens shifters are rod shaped, extendable, and inserted in the sliding cutout, for supporting respectively the second lens holder and the first lens holder in a slidable manner.

Each of the first and second lens shifters includes a first tube, inserted in the sliding cutout, for supporting the sliding cutout in a slidable manner, and a second tube having the screw portion outside. A selected one of the first and second tubes is inserted in a remaining one in a slidable manner when the lid structure is in the closed position, and is drawn and protruded from the remaining one when the lid structure is in the open position.

Furthermore, a lens shifter moves the second optical element in the sliding direction. A transmission mechanism is actuated when the lid structure is slid, for driving the lens shifter according to a direction and amount of sliding of the lid structure.

The first barrel includes a photographing opening for introducing the object light to the first optical element. The lid structure and the photographing opening are disposed on an object side with respect to the main body.

The first barrel includes a photographing opening for introducing the object light to the first optical element. Furthermore, a through hole is formed in the lid structure, opposed to the main body, for receiving insertion of the first barrel.

Furthermore, a key pad unit is disposed on the first surface of the main body, externally operable, for inputting information.

Furthermore, a connector connects the lid structure with the main body to send a signal. A display panel is incorporated in the lid structure, for displaying an image according to the signal.

Also, a portable electronic equipment includes a main body. An image sensor is incorporated in the main body, for picking up an image. A lid structure is slidable on the main body between closed and open positions, positioned to lie on a first surface of the main body when in the closed position, and positioned to uncover at least part of the first surface when in the open position. At least one first optical unit receives object light incident thereon. At least one second optical unit is disposed in the main body, has an optical path extending in a sliding direction of the lid structure, for introducing the object light to the image sensor. At least one path changing optical element introduces the object light to the second optical unit by changing an optical path of the object light from the first optical unit. An optical system container is extendable in the sliding direction, for containing the first and second optical units and the path changing optical element, for entering the main body when the lid structure is in the closed position, to decrease an optical path length of the second optical unit, and for protruding from the main body when the lid structure is in the open position, to increase the optical path length of the second optical unit.

Furthermore, a connector connects the lid structure with the main body to send a signal. An antenna is incorporated in the lid structure, for transmitting and receiving the signal wirelessly. A speaker is incorporated in the lid structure, for outputting sound according to the signal. A microphone is incorporated in the main body, for detecting sound to generate a signal. A communication circuit is connected with the speaker and the microphone, for transmission and reception in the antenna.

Furthermore, a display panel is incorporated in the lid structure, for displaying an image according to the signal.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
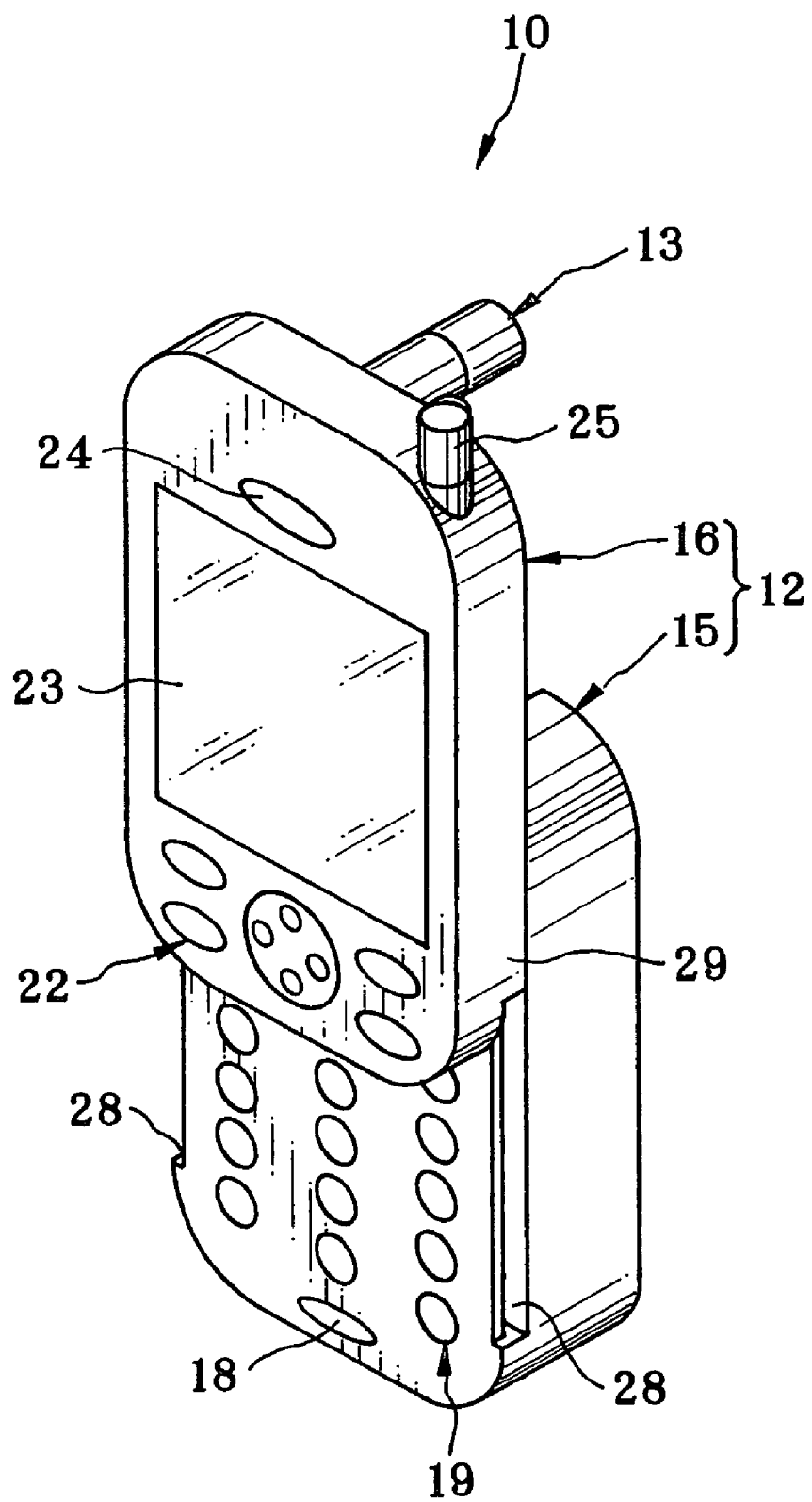
FIG. 1 is a perspective view illustrating a cellular telephone handset.
Figure 2:
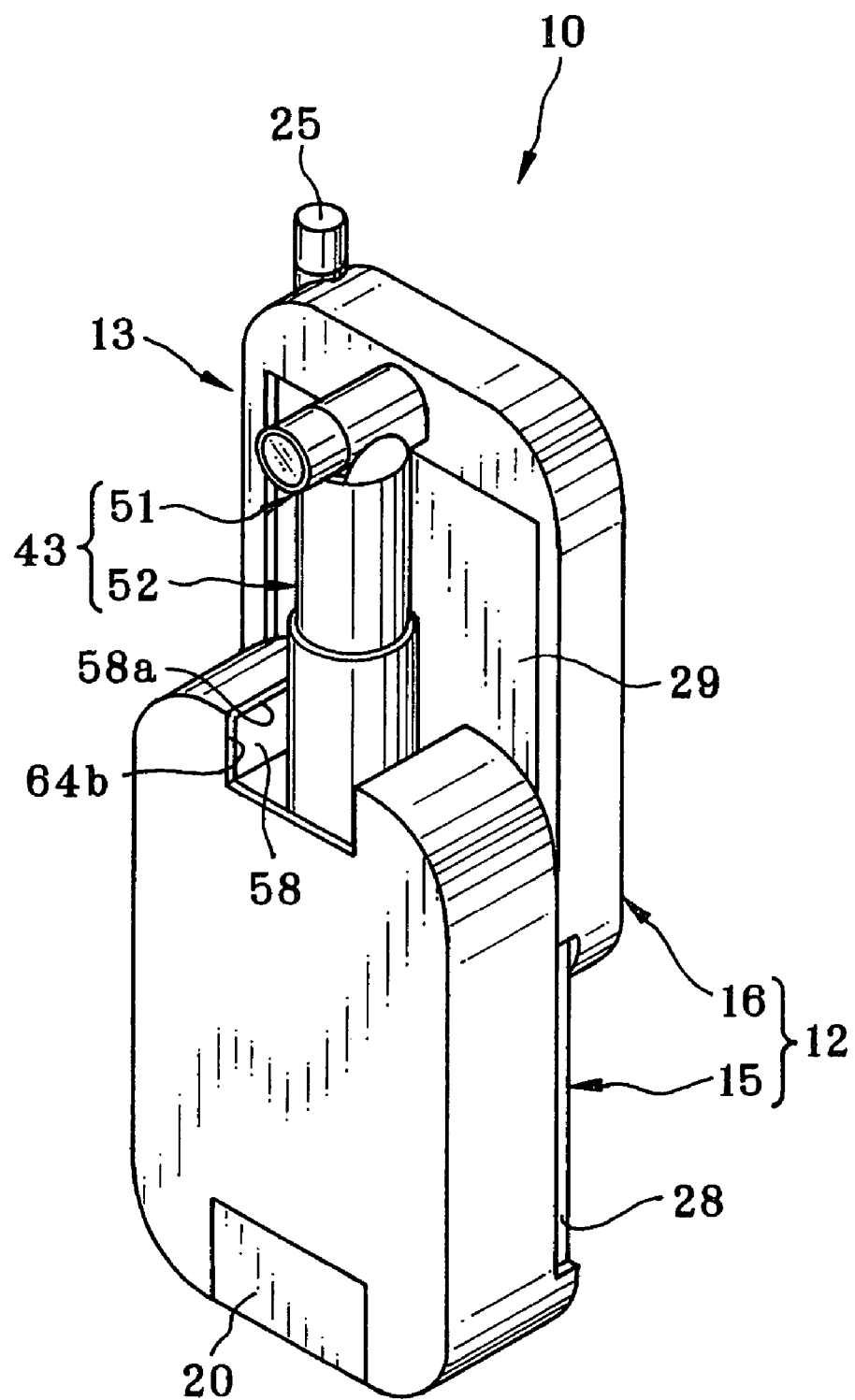
FIG. 2 is a rear perspective view illustrating the cellular telephone handset.
Figure 3:
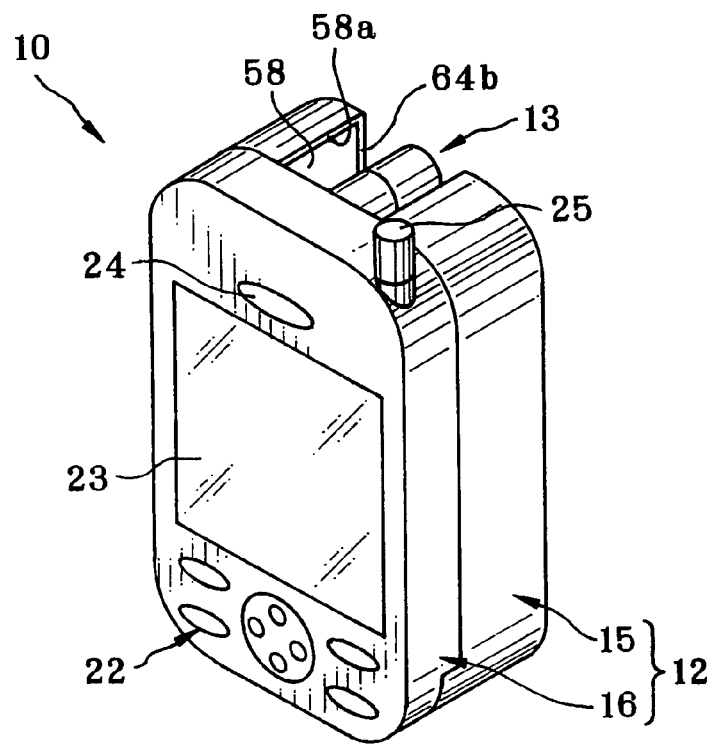
FIG. 3 is a perspective view illustrating the cellular telephone handset in a closed state.

In FIG. 1, a sliding type of cellular telephone handset 10 as portable electronic equipment for communication is illustrated. In FIG. 2, the cellular telephone handset 10 is viewed from the rear. The cellular telephone handset 10 includes a telephone casing 12 for a communication device, and a camera module or camera device 13 for image pickup.

The telephone casing 12 has a main body 15 with a built-in transmission unit, and a lid shaped reception unit 16 as a lid structure. A dimension of the periphery of the lid shaped reception unit 16 is substantially equal to that of the main body 15. Various elements are incorporated in the main body 15, including a transmission microphone 18, a ten key pad, a power button and a key pad unit 19. The microphone 18 is directed on the user side. The ten key pad is used for input information of numbers for a phone call. The power button is depressed for turning on and off of a power source. The key pad unit 19 includes buttons to input a setting. A battery lid 20 is disposed on the rear of the main body 15 for closing a battery chamber (not shown) for containing a battery.

A subsidiary key pad unit 22, a display panel 23 or an LCD, and a reception speaker 24 are disposed on a front face of the lid shaped reception unit 16. The subsidiary key pad unit 22 includes a mode selector, a shutter button, a zoom button 22a and the like. The mode selector sets the cellular telephone handset 10 in a selected one of plural modes including a communication mode, an image pickup mode and the like. A shutter button is depressible for the image pickup. The zoom button 22a changes a zooming magnification. See FIG. 7. An image or information is indicated on the display panel 23 according to the selected mode, for example, a telephone number of a caller of a call, time of the call, or a live image of an object. An antenna 25 is disposed on an upper face of the lid shaped reception unit 16.

A guide channel 28 is formed in each of edges of the main body 15 defined between its front face and lateral faces, and extends in parallel with a longer side line of the main body 15. A guide ridge 29 is formed on each of edges of the lid shaped reception unit 16 defined between its front face and lateral faces, for engagement with the guide channel 28 for the purpose sliding. See FIG. 2. The lid shaped reception unit 16 is kept slidable in the direction of the longer side face by the main body 15. In FIGS. 1-4, the lid shaped reception unit 16 is slidable between closed and open positions, and when in the closed position, covers the front face of the main body 15 completely in a retracted state, and when in the open position, comes to extend from the main body 15 to uncover the key pad unit 19 of the main body 15 externally.

A recess (not shown) is formed in the guide channel 28. A projection is formed on the guide ridge 29 for engagement with the recess with a click to retain, particularly when the lid shaped reception unit 16 is in any one of the closed and open positions. A regulating mechanism (not shown) is associated with a front face of the main body 15 and a rear face of the lid shaped reception unit 16, and-blocks movement of the lid shaped reception unit 16 further than the open position.

Before and after the use of the cellular telephone handset 10 for communication or image pickup, a user keeps the lid shaped reception unit 16 slid in the closed position. The lid shaped reception unit 16 on the main body 15 is in the closed state. When he or she wishes to use, the lid shaped reception unit 16 is slid to the open position. The lid shaped reception unit 16 on the main body 15 is in the open state. A detection sensor 35 of FIG. 7 for open and closed states is associated for the purpose of detecting sliding of the lid shaped reception unit 16 to the open position so as to turn on a power source of the cellular telephone handset 10. An example of the detection sensor 35 includes a magnet (not shown) and a magnetic sensor (not shown). The magnet is embedded in the guide ridge 29. The magnetic sensor is embedded in a lower portion of the guide channel 28. A position of the magnetic sensor is so determined that a detection signal is output only when the lid shaped reception unit 16 is in the open position. A connector 30 of FIG. 7 sends or receives signals and power between the main body 15 and the lid shaped reception unit 16 when the lid shaped reception unit 16 is in the open position.

Figure 4:
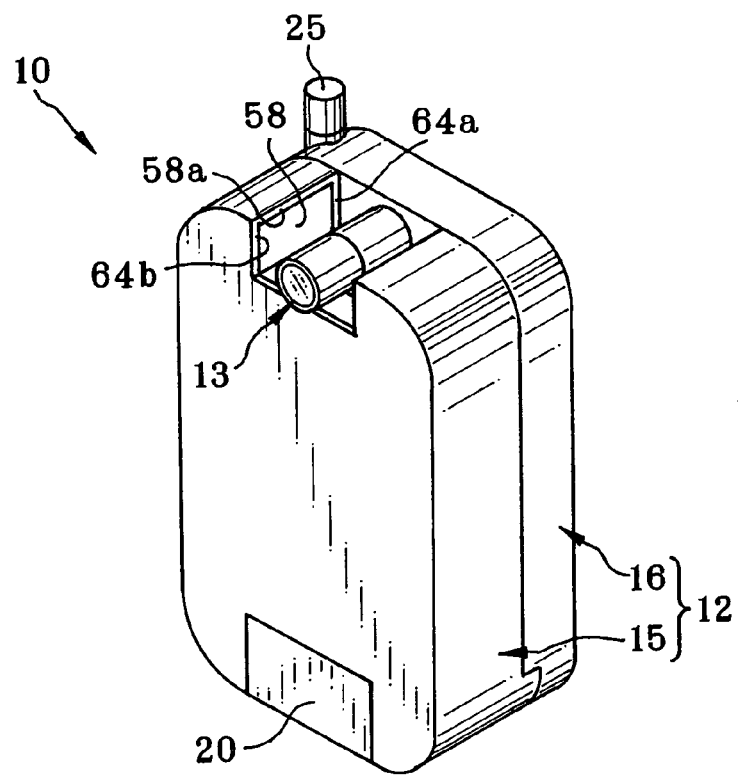
FIG. 4 is a rear perspective view illustrating the cellular telephone handset in the closed state.
Figure 5:
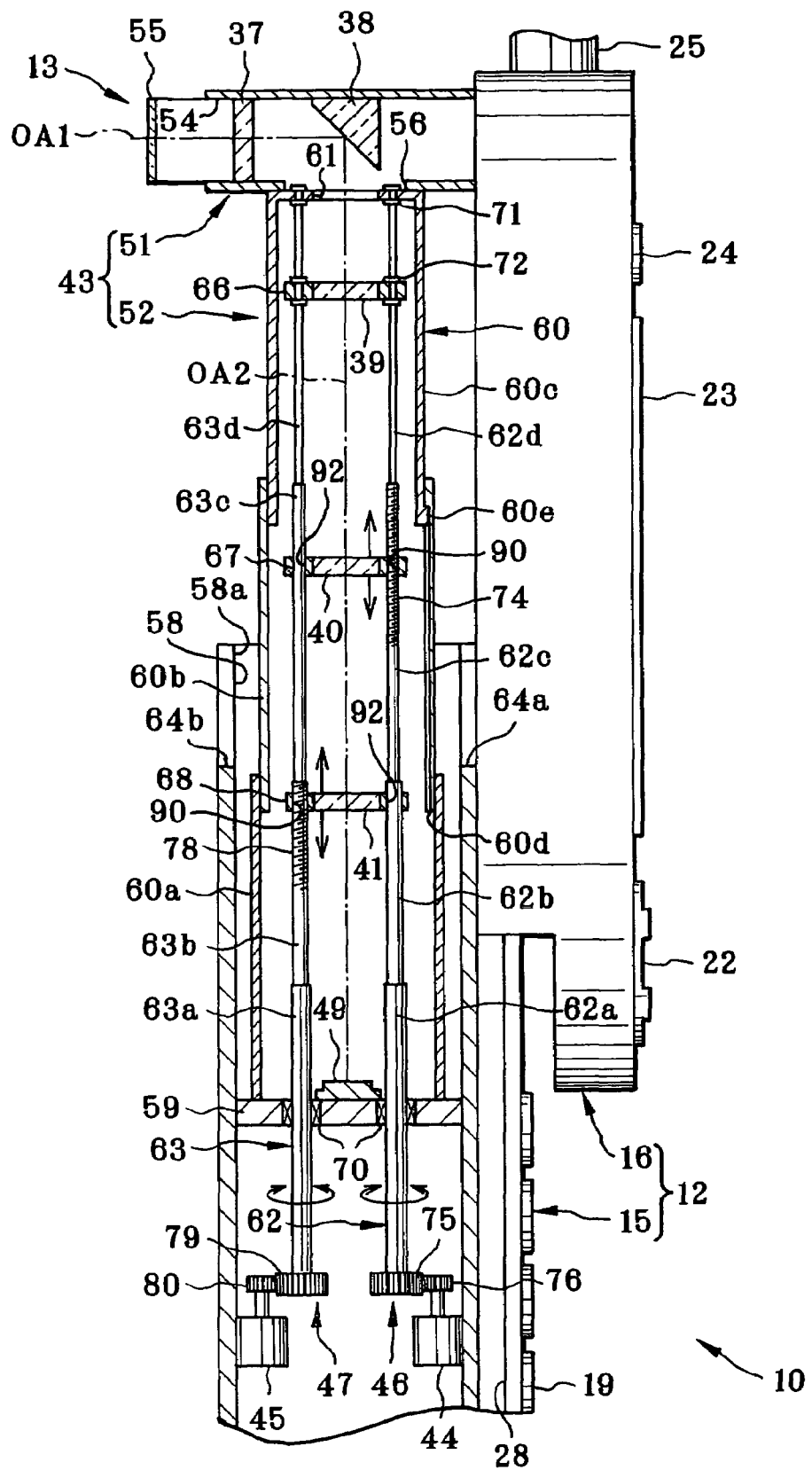
FIG. 5 is a cross section illustrating the cellular telephone handset in the open state.

The camera device 13 of the invention is described by referring to FIGS. 4 and 5. In FIG. 4, the camera device 13 is viewed in a section when the cellular telephone handset 10 stands extended in the open state. In FIG. 5, the camera device 13 is viewed in a section when the cellular telephone handset 10 stands shortened in the closed state. The camera device 13 includes a first lens element 37 as first optical element, a prism 38 as path bending or path changing optical element, a second lens element 39 as second optical element, a third lens element 40 with a movable lens element for zooming, a fourth lens element 41, an optical system container 43, first and second motors 44 and 45, first and second lens driving mechanisms 46 and 47, an image sensor or CCD 49, and the like.

A photographing optical system of the invention is constituted by the first lens element 37, the prism 38 and the second, third and fourth lens elements 39-41, and is contained in the optical system container 43. The optical system container 43 includes a first lens barrel 51 and a second lens barrel 52, and is shaped in an L form. The first lens barrel 51 contains the first lens element 37 and the prism 38. The second lens barrel 52 contains the second lens element 39, the third lens element 40 and the fourth lens element 41.

The first lens barrel 51 is a lens barrel, and extends perpendicularly to a plane where the main body 15 is placed on the lid shaped reception unit 16. The first lens barrel 51 is fixed on the rear of the lid shaped reception unit 16. A position of the first lens barrel 51 is not limited, but so predetermined that the first lens barrel 51 is higher than an upper face of the main body 15 when the lid shaped reception unit 16 is slid to the open position.

A photographing opening 54 is formed in the first lens barrel 51 at a first one of its ends opposite to a second end secured to the main body 15. A transparent protector 55 is fitted in the first lens barrel 51 to close the photographing opening 54. The first lens element 37 and the prism 38 are disposed behind the transparent protector 55. An optical axis OA1 of the first lens element 37 is perpendicular to surfaces of the main body 15 and 16 opposed to one another. Object light enters the photographing opening 54 and is incident upon the first lens element 37.

The prism 38 is positioned at an intersection point between the optical axis OA1 and the optical axis OA2 of the second, third and fourth lens elements 39-41 in the second lens barrel 52, and changes a direction of the object light from the first lens element 37 toward the second, third and fourth lens elements 39-41. The object light after the path bending or path changing passes an opening 56 in a lower face of the first lens barrel 51, and enters the second lens barrel 52.

A receiving cavity 58 is formed in the main body 15 and contains the second lens barrel 52. The receiving cavity 58 is open in the top of the main body 15. The second lens barrel 52 sets the second, third and fourth lens elements 39-41 to keep the optical axis OA2 parallel with the sliding direction of the lid shaped reception unit 16. The second lens barrel 52 telescopes and is extendable in the direction parallel to the optical axis OA2 or sliding direction according to the lid shaped reception unit 16.

The second lens barrel 52 includes a support 59, an extendable barrel portion 60 for zooming, and rod shaped lens shifters 62 and 63. The support 59 is disposed in the receiving cavity 58. The extendable barrel portion 60 is fixed on the support 59. The rod shaped lens shifters 62 and 63 retain the second, third and fourth lens elements 39-41 in the extendable barrel portion 60.

An opening 58a of FIG. 5 is formed in the main body 15. The extendable barrel portion 60, when the lid shaped reception unit 16 is in the closed position, is contained in the main body 15, and when the lid shaped reception unit 16 is in the open position, is protruded from the opening 58a. The extendable barrel portion 60 includes a stationary container sleeve or shell 60a, an intermediate movable container sleeve 60b, and an end movable container sleeve 60c. The stationary container sleeve 60a is fixed on the support 59. The intermediate container sleeve 60b is kept movable on the stationary container sleeve 60*a* in the direction of the optical axis OA2. The end container sleeve 60*c* is kept movable on the intermediate container sleeve 60*b* back and forth.

The end container sleeve 60*c* has an upper face fixed on a lower face of the first lens barrel 51. An opening 61 is formed in an upper face of the end container sleeve 60*c*, communicates with the opening 56, and allows entry of the object light directed by the prism 38. The end container sleeve 60*c*, which is stationary on the first lens barrel 51, is slid along the optical axis OA2 by sliding of the lid shaped reception unit 16.

A key way 60*d* is formed in the inner wall of the intermediate container sleeve 60*b*, and extends in the direction of the optical axis OA2. A key 60*e* is formed on the periphery of the end container sleeve 60*c*, and engaged with the key way 60*d* for an anti dropping structure. When the lid shaped reception unit 16 slides from the closed position to the open position, the end container sleeve 60*c* and the intermediate container sleeve 60*b* are caused to advance from the stationary container sleeve 60*a*. When the lid shaped reception unit 16 slides from the open position to the closed position, the end container sleeve 60*c* and the intermediate container sleeve 60*b* are pushed by the first lens barrel 51 and becomes contained in the stationary container sleeve 60*a*.

There are cutouts 64*a* and 64*b* formed in surfaces of the main body 15 and directed upwards and backwards, for allowing the first lens barrel 51 to enter the main body 15 when the lid shaped reception unit 16 is slid to the closed position. The optical system container 43 with the first and second lens barrels 51 and 52 can be contained in the main body 15 before and after the use of the camera, so the cellular telephone handset 10 can have further portability. Also, the photographing opening 54 remains open when not in use. The cellular telephone handset 10 can be used as a camera in the collapsed state.

Lens holders 66, 67 and 68 support respectively the second, third and fourth-lens elements 39, 40 and 41. A nut portion 90 and a sliding through hole 92 are formed in the lens holders 66-68, and receive insertion of the rod shaped lens shifters 62 and 63. The rod shaped lens shifters 62 and 63 are extendable in the direction of the optical axis OA2 in a similar manner to the extendable barrel portion 60. The rod shaped lens shifter 62 includes a support tube 62*a*, a first middle tube 62*b*, a second middle tube 62*c*, and an end rod 62*d*.

A bearing 70 keeps the support tube 62*a* rotatable on the support 59. The first middle tube 62*b* is supported by the support tube 62*a* in a manner movable forwards. Similarly, the second middle tube 62*c* is supported by the first middle tube 62*b* in a manner movable forwards. The end rod 62*d* is supported by the second middle tube 62*c* in a manner movable forwards.

Furthermore, a key way (not shown) is formed in an inner surface of the support tube 62*a*, the first middle tube 62*b* and the second middle tube 62*c* in a manner similar to the key way 60*d*. A key is formed on the periphery of the first middle tube 62*b*, the second middle tube 62*c* and the end rod 62*d* in a manner similar to the key 60*e*. Thus, the tubes and rod 62*a*-62*d* rotate together. This enables adjustment of a zooming magnification and adjustment of focus.

The rod shaped lens shifter 63 is structurally equal to the rod shaped lens shifter 62, and includes a support tube 63*a*, a first middle tube 63*b*, a second middle tube 63*c* and an end rod 63*d*. Those are coupled with one another and rotate together.

Distal ends of the end rods 62*d* and 63*d*, at the top as viewed in the drawing, are kept rotatable on the upper surface of the end container sleeve or shell 60*c* of the extendable barrel portion 60. A stopper 71 and a bearing (not shown) are used at the distal ends of the end rods 62*d* and 63*d*. The end rods 62*d* and 63*d* are inserted in the holes in the lens holder 66 to keep the second lens element 39 slidable. A stopper 72 regulates a range of the second lens element 39 for moving. A bearing (not shown) is disposed in each of through holes of the lens holder 66 for the second lens element 39.

The second middle tubes 62*c* and 63*c* are inserted in the nut portion 90 and the sliding through hole 92 in the lens holder 67 for the third lens element 40, and support the third lens element 40. The first middle tubes 62*b* and 63*b* are inserted in the sliding through hole 92 and the nut portion 90 in the lens holder 68 for the fourth lens element 41, and support the fourth lens element 41. In the embodiment, the first motor 44 in the main body 15 drives the first lens driving mechanism 46 to change a zooming magnification by moving the third lens element 40 in the direction of the optical axis OA2. The second motor 45 drives the second lens driving mechanism 47 to adjust the focus by moving the fourth lens element 41 in the direction of the optical axis OA2.

The first lens driving mechanism 46 includes a ball screw portion 74 with a helical thread, a rod gear 75, a key and a key way (not shown). The ball screw portion 74 is formed on a peripheral surface of the second middle tube 62*c*. The rod gear 75 is secured to a lower end of the support tube 62*a*. The key and key way cooperate to rotate the tubes and rod 62*a*-62*d* together in a firmly coupled manner in the rod shaped lens shifter 62. A motor gear 76 is attached to an output shaft of the first motor 44, and meshed with the rod gear 75. When the first motor 44 rotates, the rod shaped lens shifter 62 rotates together.

An inner thread lies inside the nut portion 90 of the lens holder 67 for the rod shaped lens shifter 62, to mesh the ball screw portion 74 with the nut portion 90. A bearing (not shown) is disposed in the sliding through hole 92. When the rod shaped lens shifter 62 or the second middle tube 62*c* is rotated in the clockwise direction, the third lens element 40 comes near to the second lens element 39 to set the magnification at a wide-angle magnification by zooming. When the rod shaped lens shifter 62 is rotated in the counterclockwise direction, the third lens element 40 moves away from the second lens element 39 to set the magnification at a telephoto magnification.

The second lens driving mechanism 47 is structured equally to the first lens driving mechanism 46, and includes a ball screw portion 78 with a helical thread, a rod gear 79, a key and a key way (not shown). The ball screw portion 78 is formed about the first middle tube 63*b*. The key and the key way cause a support tube 63*a*, the first middle tube 63*b*, the second middle tube 63*c*, and an end rod 63*d* to rotate together. A motor gear 80 at an output shaft of the second motor 45 is meshed with the rod gear 79, so rotation of the second motor 45 causes the rod shaped lens shifter 63 to rotate.

An inner thread lies formed in the nut portion 90 of the lens holder 68 for the rod shaped lens shifter 63, to mesh the ball screw portion 78 with the nut portion 90. A bearing (not shown) is disposed in the sliding through hole 92. When the rod shaped lens shifter 63 is rotated in the clockwise or counterclockwise direction, the fourth lens element 41 moves along the optical axis OA2, to adjust the focus.

The rod shaped lens shifters 62 and 63 are extendable along the optical axis OA2. When the lid shaped reception unit 16 is slid from the closed position to the open position, the rod shaped lens shifters 62 and 63 become extended. See FIG. 5. It is possible to set a long range where the third lens element 40 is movable, because optical path lengths of the second, third and fourth lens elements 39-41 can be greater.

In contrast, when the lid shaped reception unit 16 is slid from the open position to the closed position, the rod shaped lens shifters 62 and 63 are shortened. See FIG. 6. The optical path length of the second, third and fourth lens elements 39-41 is reduced. So the optical system container 43 can be contained in the main body 15.

The image sensor or CCD 49 is supported on the support 59. A photo receptor surface (not shown) of the image sensor 49 includes a great number of photo diodes arranged in a matrix form. The image sensor 49 receives object light having passed the first lens element 37, the prism 38, and the second, third and fourth lens elements 39-41, and photoelectrically converts the light to output a pickup signal.

Figure 7:
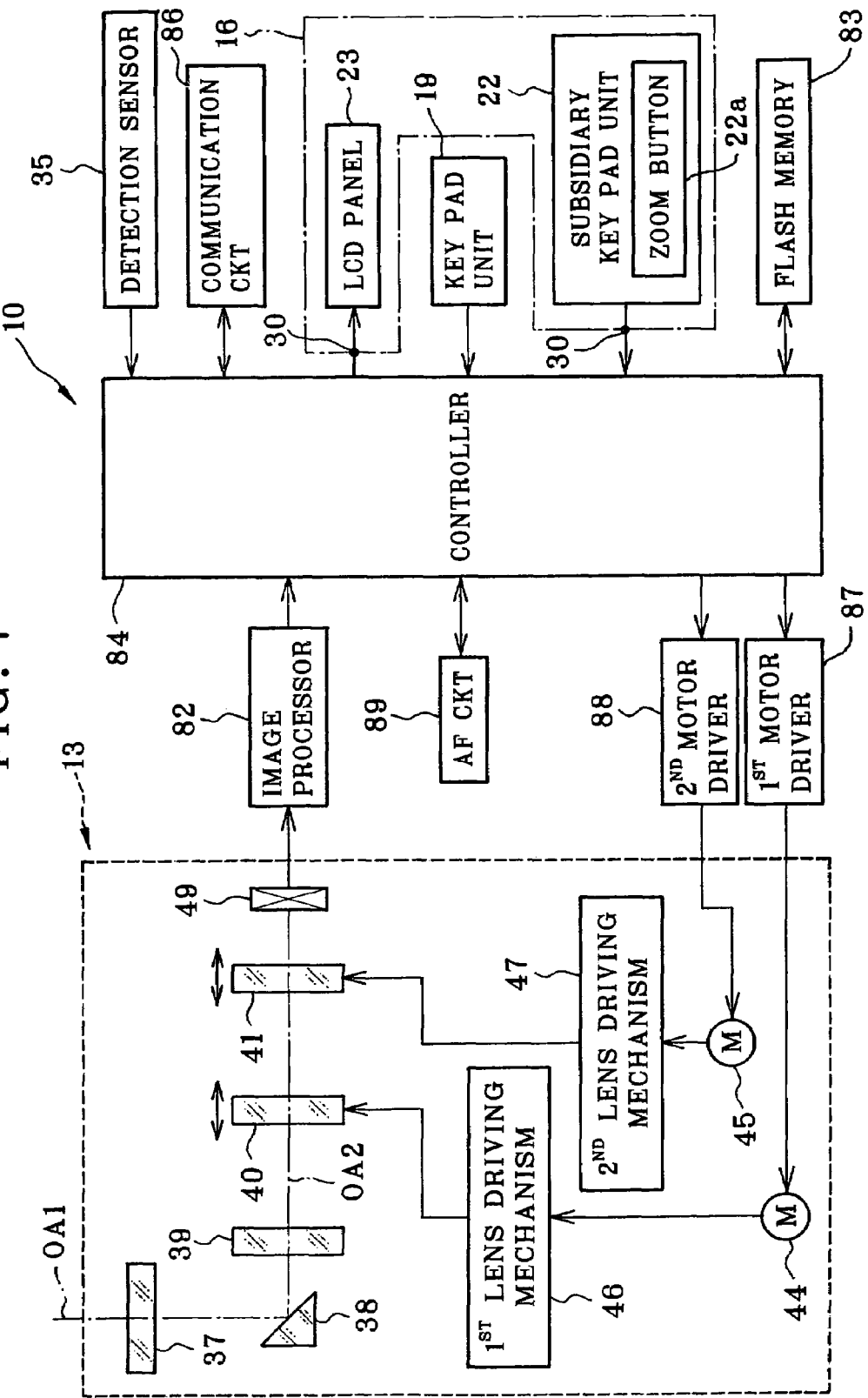
FIG. 7 is a block diagram schematically illustrating circuit arrangement of the cellular telephone handset.

According to an image pickup signal output by the image sensor 49, raw image data is produced by conversion in an amplifier and an A/D converter as data before processing. An image processor 82 of FIG. 7 is supplied by the raw image data, and processes the same for various settings of processing, including matrix arithmetic processing, white balance adjustment, gamma correction, and the like. The processed image data is stored in a frame memory (not shown) in a temporary manner. A live image is displayed on the display panel 23 according to image data stored in the frame memory. When a shutter button (not shown) of the subsidiary key pad unit 22 is depressed, a flash memory or data storage 83, such as a flash RAM in the cellular telephone handset 10, is accessed to write the stored image data thereto, the image data being in a compressed form.

A controller 84 controls various circuit elements in the cellular telephone handset 10. Those elements include a communication circuit 86, first and second motor drivers 87 and 88, an AF circuit 89 as well as the key pad unit 19, the subsidiary key pad unit 22, the display panel 23, the detection sensor 35, the image processor 82 and the flash memory 83. An image sensor driver (not shown) drives the image sensor 49.

The first motor driver 87 controls rotation of the first motor 44. When the zoom button 22a of the subsidiary key pad unit 22 is operated, the controller 84 causes the first motor driver 87 to control the first motor 44, to cause the rod shaped lens shifter 62 to rotate in a clockwise or counterclockwise direction. The third lens element 40 is moved in the direction of the optical axis OA2, to change the zooming magnification at a value desired by a user.

The second motor driver 88 controls rotation of the second motor 45. The AF circuit 89 calculates an AF evaluation value according to contrast information of an image data of one frame generated by the image processor 82. In general, the contrast information is the highest when the in-focus state of an object is obtained, to maximize the AF evaluation value. Information of an AF evaluation value is input to the controller 84 as an input signal. The controller 84 causes the second motor driver 88 to control rotation of the second motor 45 according to the AF evaluation value, for focusing by moving the fourth lens element 41 to an in-focus position.

Object light passed through the first lens element 37 has a path which is changed by the prism 38 to extend toward the second, third and fourth lens elements 39-41 inside the main body 15. The optical system container 43 is in the L shape and extendable structurally upon sliding of the main body 15. The optical path length of the second, third and fourth lens elements 39-41 can be set greater only when the cellular telephone handset 10 is used. The optical system container 43 can be contained in the main body 15 when the cellular telephone handset 10 is not used.

The operation of the embodiment is described. When the cellular telephone handset 10 is used for image pickup, a user moves the lid shaped reception unit 16 from the closed position to the open position. If a power source for the cellular telephone handset 10 has been turned off, the controller 84 turns on the power source by evaluating a detection signal output by the detection sensor 35.

When the lid shaped reception unit 16 is slid to the open position, the second lens barrel 52 in the optical system container 43 telescopes longer. The optical path length of the second, third and fourth lens elements 39-41 can be greater. Thus, zooming magnification of the cellular telephone handset 10 can be predetermined high in comparison with known products, because a range of moving of the third lens element 40 can be wide. A user can zoom the image pickup lens with high degree of freedom. Furthermore, macroscopic photography is possible without additional mechanism for macroscopic photography in the camera device 13, because the range of moving of the third lens element 40 is wide.

When a user operates the subsidiary key pad unit 22 to change over the state of the cellular telephone handset 10 to the image pickup mode, the controller 84 drives the image sensor or CCD 49 to output an image pickup signal by photoelectric conversion of object light. The image pickup signal from the image sensor 49 is used to produce raw image data, which is processed by the image processor 82 for image processing.

Processed image data is stored temporarily in a frame memory (not shown). The display panel 23 displays alive image according to image data read from the frame memory. A user views the live image, and depresses the zoom button 22a to change the zooming magnification, to frame an object to be picked up. The controller 84 drives the first motor 44 to change the magnification, and also adjusts the focus by driving the second motor 45 according to an AF evaluation value of a signal output by the AF circuit 89. Then a shutter button (not shown) in the subsidiary key pad unit 22 is depressed, to compress the image data read from the frame memory, and then write the compressed image data to the flash memory or data storage 83.

The user after the image pickup turns off the power source of the cellular telephone handset 10, and slides the lid shaped reception unit 16 to the closed position. The optical path length of the second, third and fourth lens elements 39-41 is reduced, to allow collapsing of the optical system container 43 in the main body 15. Thus, portability of the cellular telephone handset 10 can be raised at the time before or after use of the cellular telephone handset 10.

In the present embodiment, the optical system is constituted by the first lens element 37, the prism 38, and the second, third and fourth lens elements 39-41. The optical system container 43 is extendable and has an L shape. Consequently, moving of the third lens element 40 in the direction of the optical axis OA1 is not required. Thicknesses of the main body 15 and the lid shaped reception unit 16 can be reduced. The cellular telephone handset 10 having a camera with a zooming structure can be produced in a reduced size.

Figure 8:
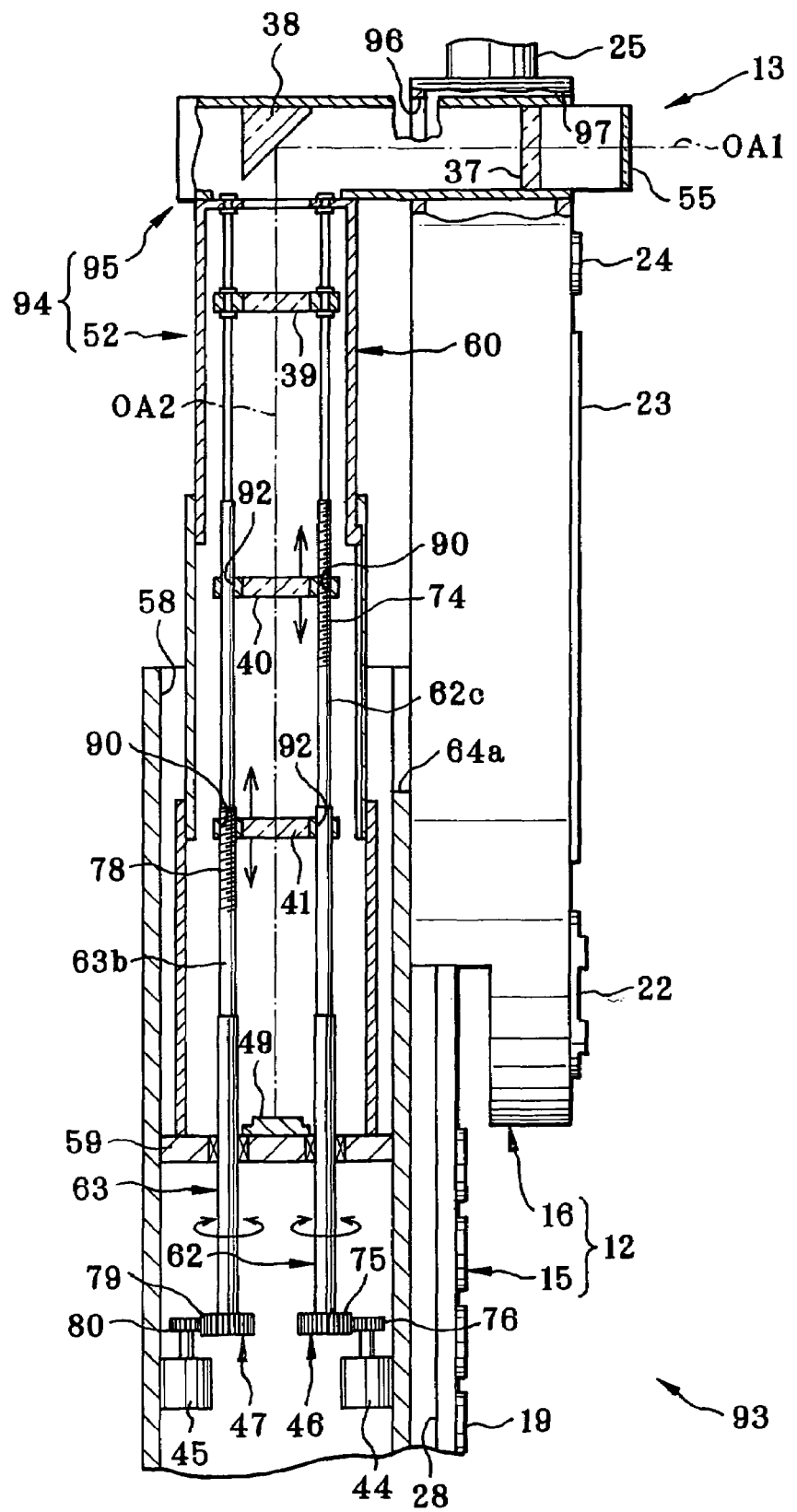
FIG. 8 is a cross section illustrating one preferred cellular telephone handset in which a photographing opening opens toward a user.
Figure 9:
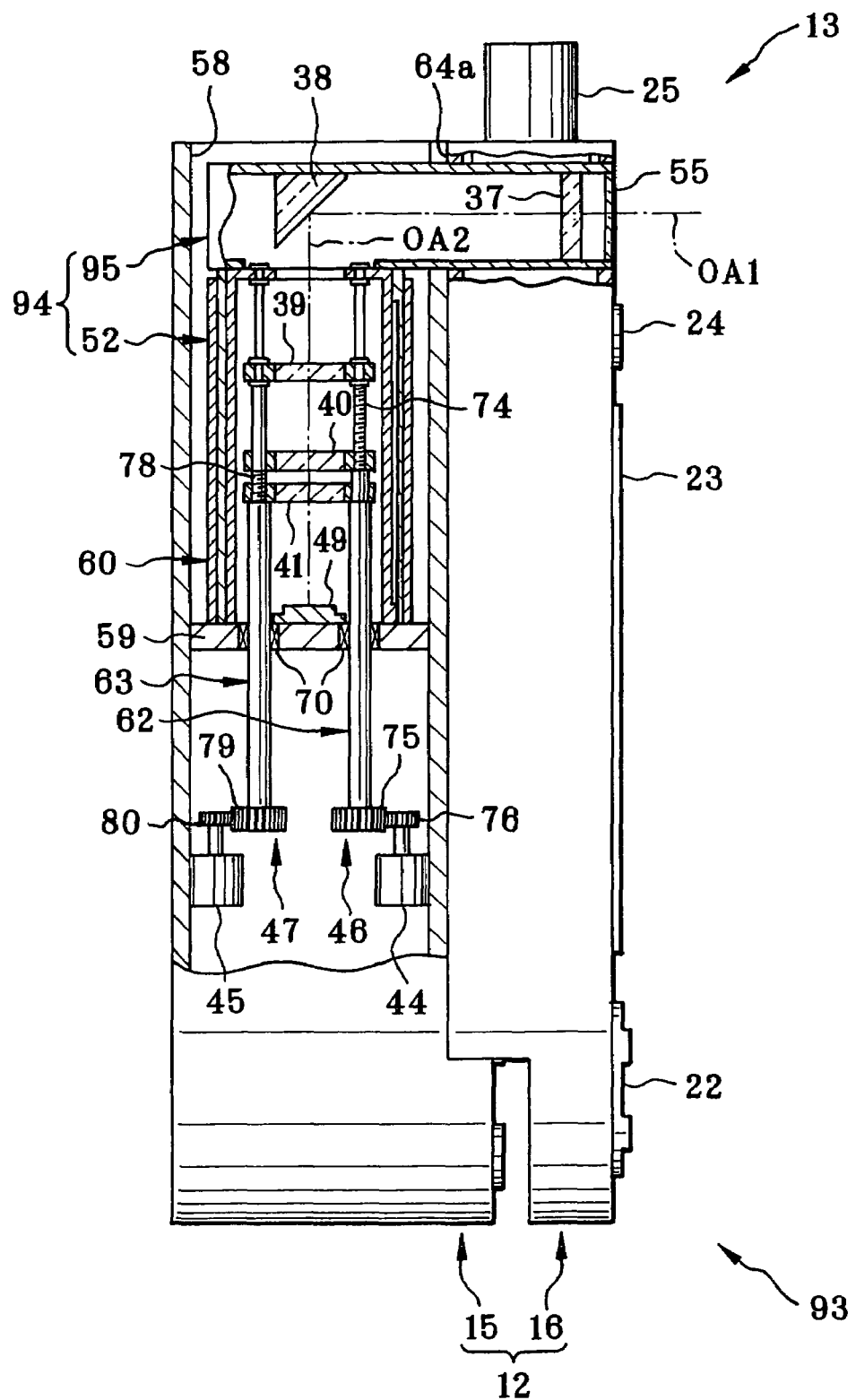
FIG. 9 is a cross section illustrating the cellular telephone handset of FIG. 8 but in the closed state.

In the above embodiment, the lid shaped reception unit 16 is positioned on the user side in contrast with the photographing opening 54 positioned on the object side opposite to the user side. However, the photographing opening 54 can be directed differently. Electronic equipment can be structured as a camera built-in telephone with which users can talk to each other in viewing their faces. In FIGS. 8 and 9, a preferred cellular telephone handset 93 as electronic TV telephone equipment is illustrated. In FIG. 8, the cellular telephone handset 93 in an open form is viewed in a section. In FIG. 9, the cellular telephone handset 93 is in the closed form. Elements similar to those of the above embodiments are designated with identical reference numerals.

An optical system container 94 is included in the cellular telephone handset 93. A first lens barrel 95 is disposed in the optical system container 94. For the cellular telephone handset 93, the structure of the cellular telephone handset 10 is repeated except for the first lens barrel 95. The first lens barrel 95 extends perpendicularly to a surface where the main body 15 is opposed to the lid shaped reception unit 16. A through hole 96 is formed through an upper end of the main body 15, and receives insertion of the first lens barrel 95. See FIG. 8. A position of the through hole 96 is so predetermined that the first lens barrel 95 can be located higher than the upper face of the main body 15 when the lid shaped reception unit 16 is slid to the open position.

In FIG. 8, a photographing opening 97 is formed in the first lens barrel 95, and open in a front face of the lid shaped reception unit 16. The transparent protector 55 is fitted in the photographing opening 97. The first lens element 37 and the prism 38 a red is posed behind the transparent protector 55. Object light incident through the photographing opening 97 is received by the image sensor or CCD 49 after passage through the first lens element 37, the prism 38 and the second, third and fourth lens elements 39-41.

The first lens barrel 95 is so shaped that its portion protruding to the back of the lid shaped reception unit 16 has a shorter size than a distance between a rear face of the lid shaped reception unit 16 and a rear face of the main body 15. When the lid shaped reception unit 16 is slid to the closed position, the first lens barrel 95 with the second lens barrel 52 is contained in the main body 15 and collapsed. See FIG. 9. In the cellular telephone handset 93, the cutout 64a is formed. However, the cutout 64b, which is formed in the cellular telephone handset 10 at the main body 15 of FIG. 5, is unnecessary in the cellular telephone handset 93.

Consequently, the second lens barrel 52 in the cellular telephone handset 93 can telescope by sliding of the lid shaped reception unit 16. A handset as a product can have a reduced size in a similar manner to the cellular telephone handset 10 in comparison with known products.

Figure 10:
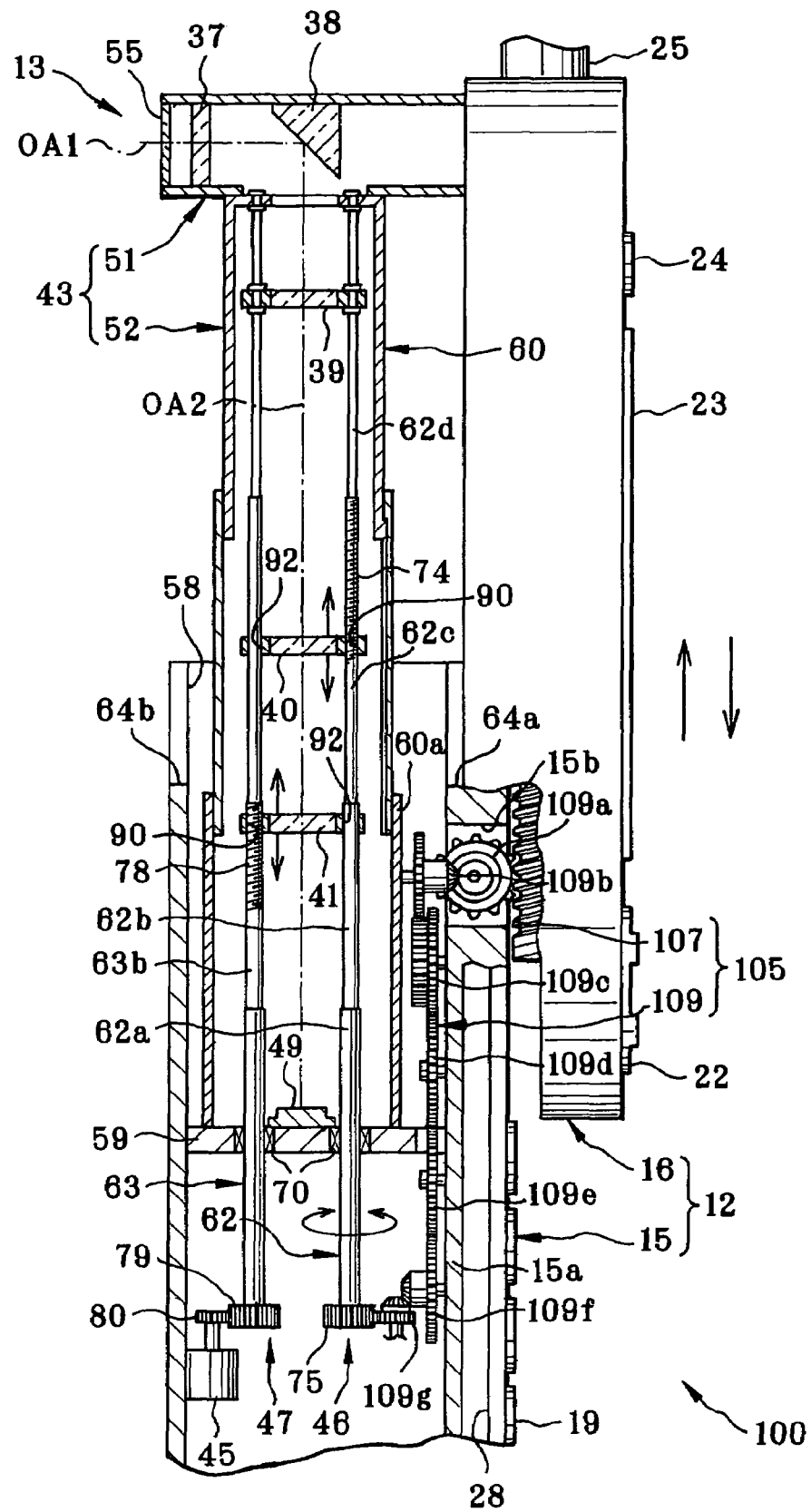
FIG. 10 is a cross section illustrating another preferred cellular telephone handset in which sliding of the reception unit is evaluated.
Figure 11:
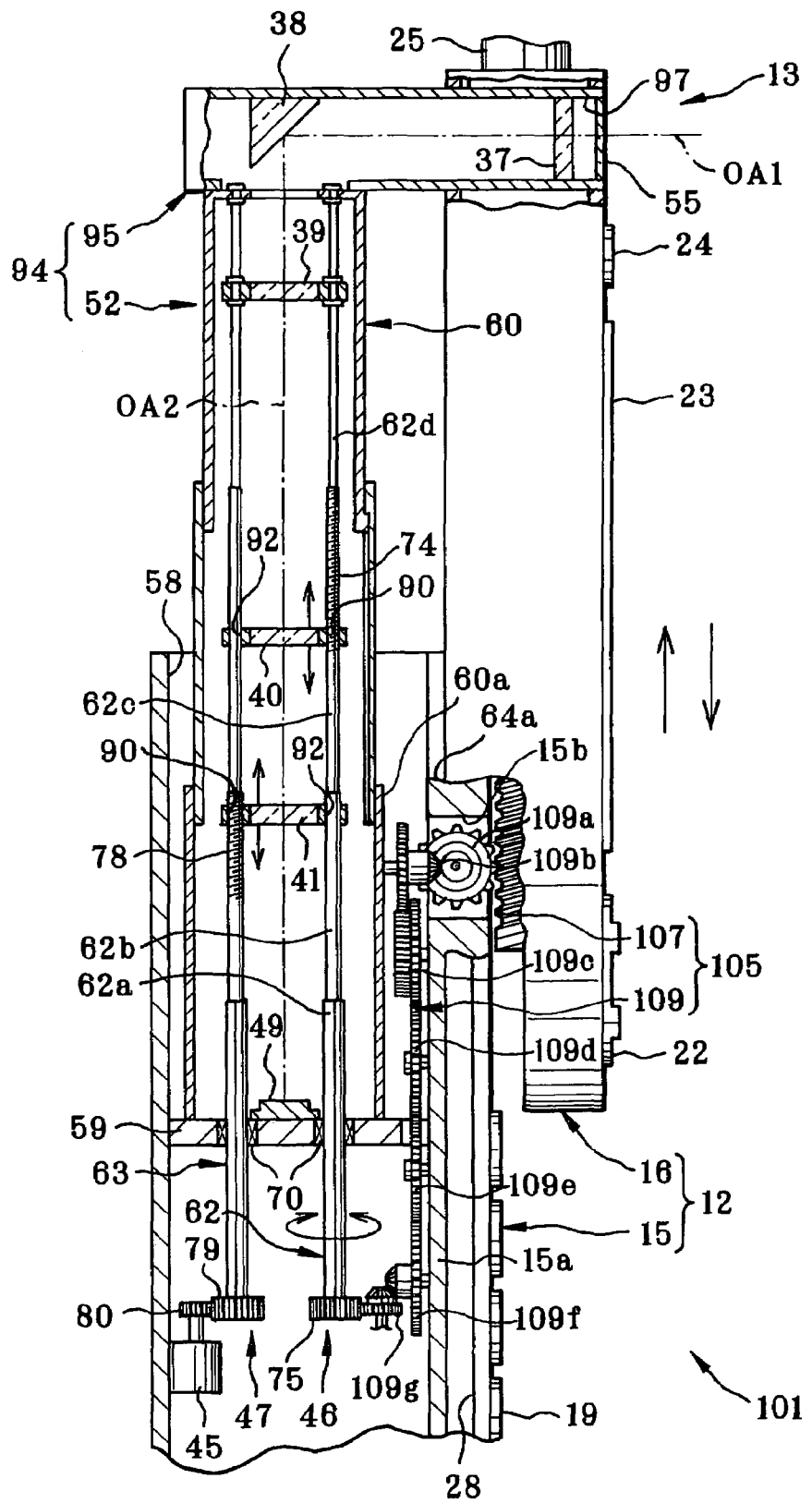
FIG. 11 is a cross section illustrating the cellular telephone handset of FIG. 10 but in the closed state.

It is possible to change a zooming magnification by a structure different from the first lens driving mechanism 46. In FIG. 10, another preferred cellular telephone handset 100 as portable electronic equipment is illustrated. In FIG. 11, one preferred cellular telephone handset 101 is illustrated. According to those, the lid shaped reception unit 16 is manually slid to move the third lens element 40 for zooming. Note that the cellular telephone handset 100 includes the optical system container 43 of FIG. 5. The cellular telephone handset 101 has the optical system container 94 of FIG. 8.

In place of the first motor 44 above, a transmission mechanism 105 is incorporated in each of the cellular telephone handsets 100 and 101, for driving the first lens driving mechanism 46 in response to sliding of the lid shaped reception unit 16. The transmission mechanism 105 includes a rack 107 and a gear train 109. The rack 107 is disposed on the lid shaped reception unit 16. The gear train 109 is accommodated in the main body 15. The rack 107 is on the rear face of the lid shaped reception unit 16, and extends in the sliding direction.

There are first to seventh gears 109a-109g in the gear train 109. A lateral panel 15a of the main body 15 has a through hole 15b. The first gear 109a is supported on a shaft which is disposed in the through hole 15b and extends in the width direction of the main body 15. The first gear 109a is a two step gear, and includes a spur gear in mesh with the rack 107, and a bevel gear in mesh with the second gear 109b.

Pivotal shafts support respectively the second to sixth gears 109b-109f, and are disposed on a surface of the stationary container sleeve or shell 60a or the lateral panel 15a to extend in the direction of the optical axis OA1. Examples of the second to sixth gears 109b-109f are two step gears, spur gears or the like, and meshed with one another as a train.

The seventh gear 109g is a two step gear, and meshed with the sixth gear 109f. The seventh gear 109g is supported rotatably on a pivotal shaft extending in parallel with the sliding direction, and meshed with the rod gear 75 constituting the first lens driving mechanism 46. When the lid shaped reception unit 16 is slid, the rod gear 75 is rotated by the gear train 109, so the rod shaped lens shifter 62 rotates. The third lens element 40 is moved along the optical axis OA2 according to the sliding amount of the lid shaped reception unit 16.

If a user wishes a telephoto magnification by zooming, the main body 15 is moved toward the open position. If he or she wishes a wide-angle magnification by zooming, the main body 15 is moved toward the closed position. The transmission mechanism 105 is effective in zooming by utilizing slide of the lid shaped reception unit 16 instead of the structure of the first motor 44.

Figure 6:
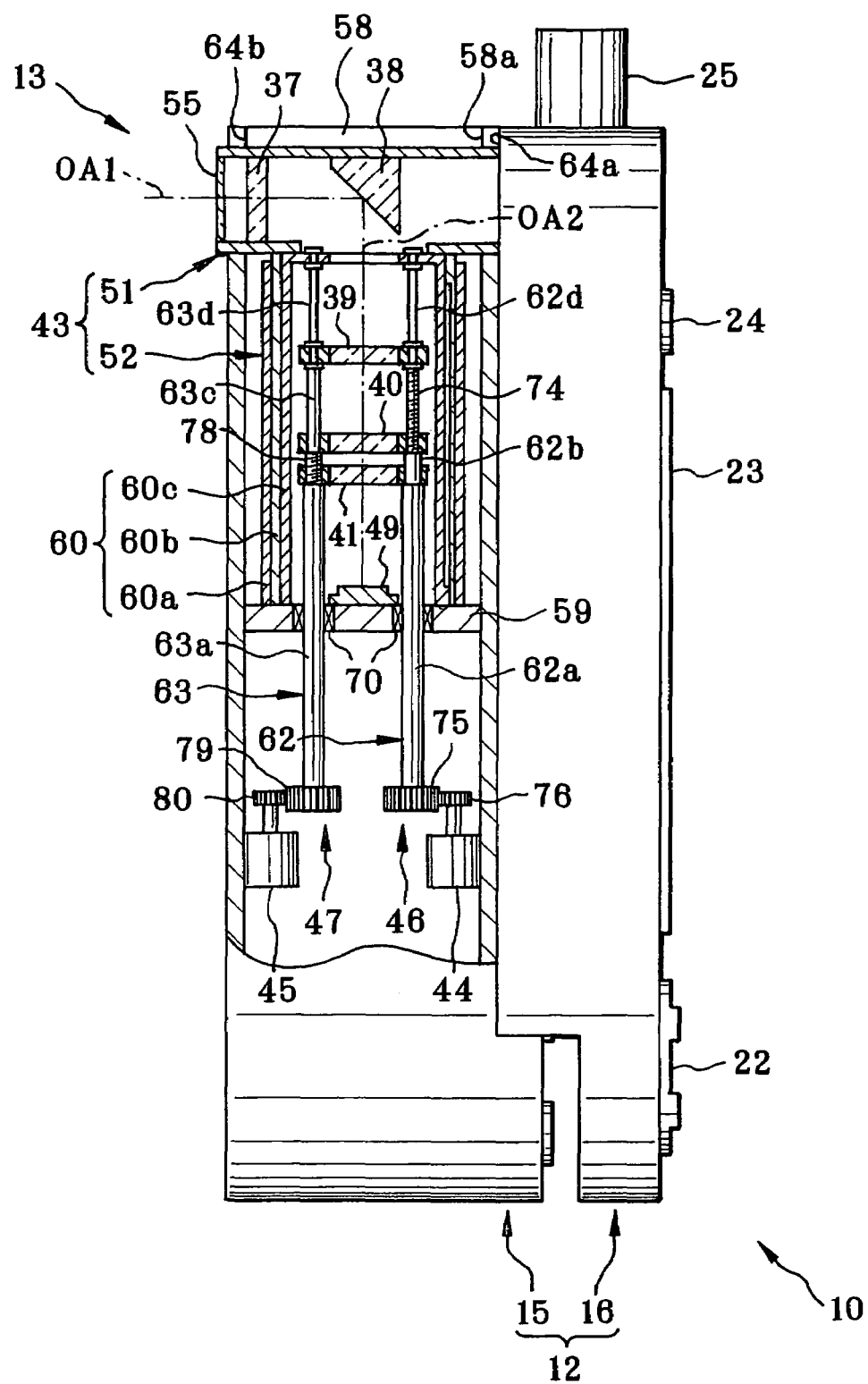
FIG. 6 is a cross section illustrating the cellular telephone handset in the closed state.
Figure 12:
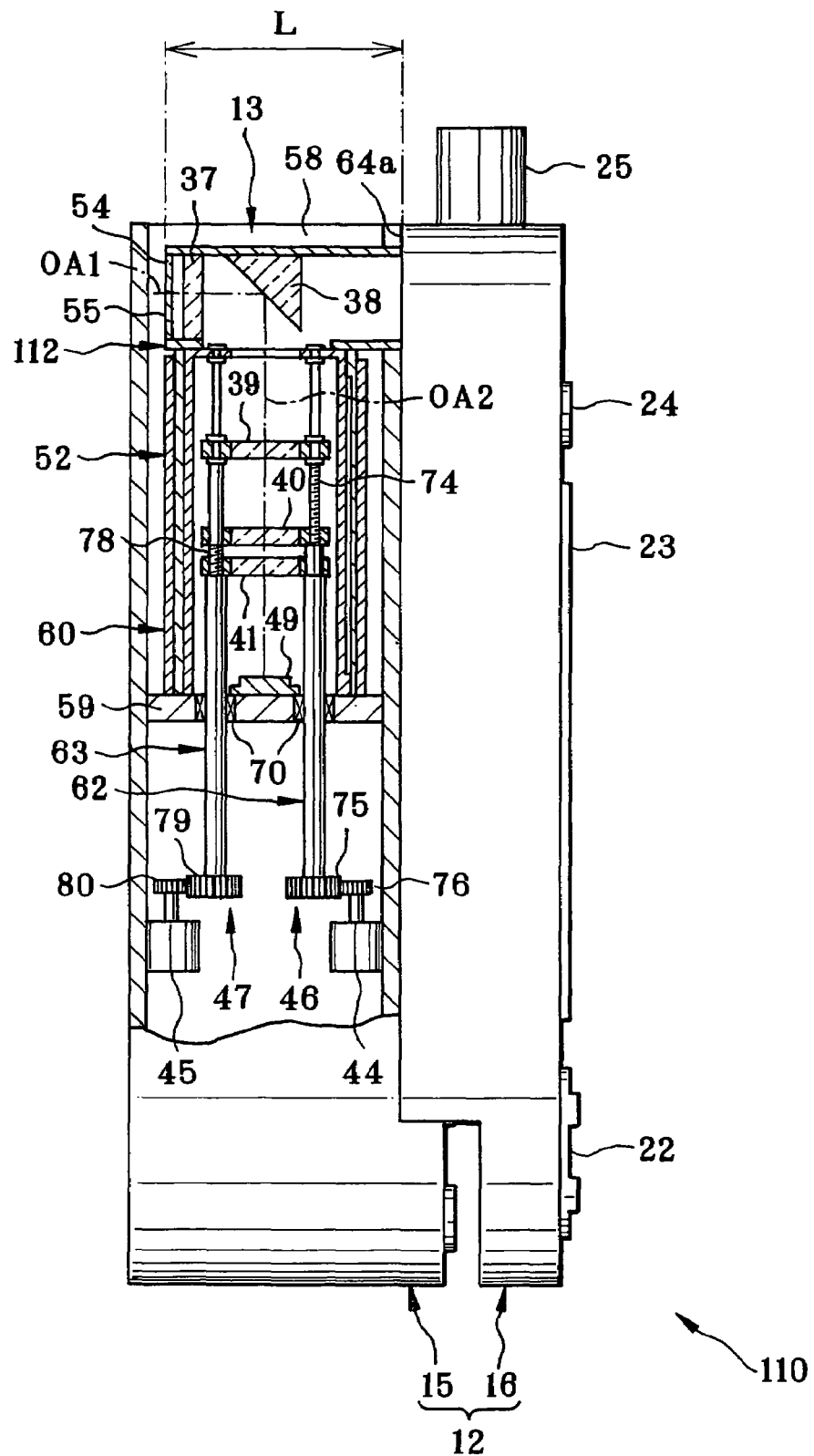
FIG. 12 is a cross section illustrating one preferred cellular telephone handset in which a photographing opening is closed in the closed state.

In the cellular telephone handset 10, the end of the first lens barrel 51 protrudes through the cutout 64b of FIG. 6 from the rear of the main body 15 when the lid shaped reception unit 16 is in the closed position. However, other structures can be used. One preferred cellular telephone handset 110 as portable electronic equipment is illustrated in FIG. 12. A first lens barrel 112 is incorporated in the cellular telephone handset 110 in place of the first lens barrel 51.

A length L of the first lens barrel 112 from the rear of the lid shaped reception unit 16 to the photographing opening 54 is so predetermined that the first lens barrel 112 does not protrude from the rear of the lid shaped reception unit 16 in the closed position. Thus, the cutout 64b of FIG. 5 is unnecessary. It is possible automatically to close the photographing opening 54 when the lid shaped reception unit 16 is in the closed position before or after use.

Note that the second lens barrel 52 for containing the second, third and fourth lens elements 39-41 can be modified in various manners. For example, the second lens barrel 52 may be unified with the first lens barrel 51. In any of those, sliding of the lid shaped reception unit 16 should contain the same in the main body 15 to reduce the optical path length of the second, third and fourth lens elements 39-41. Protruding of the lid shaped reception unit 16 from the main body 15 should enlarge the optical path length of the second, third and fourth lens elements 39-41.

Furthermore, the first lens driving mechanism 46 in the device of the invention may be any suitable structure different from that of FIGS. 5, 6, 8 and 9 with the ball screw portion 74, the rod gear 75, the key and the key way for the rod shaped lens shifter 62. Lens driving mechanisms of various types can be used for moving the third lens element 40 in the direction of the optical axis OA2. Also, the first lens driving mechanism 46 can be any suitable type of mechanism.

The transmission mechanism 105 of FIGS. 10 and 11 includes the rack 107 on the lid shaped reception unit 16 and the gear train 109 on the main body 15. However, other structures may be used. In any of those, sliding of the lid shaped reception unit 16 should move the third lens element 40.

In the above embodiment, the prism 38 is used for changing a direction of the optical path. However, a mirror or other optical elements can be used for the same purpose.

In the above embodiment, the photographing optical system is constituted by the first and second optical units, which are referred to as first and second optical systems. The first optical unit has the first lens element. The second optical unit has the second, third and fourth lens elements. However, the number of lens elements in each of the optical units may be changed. Also, each of the optical units can be constituted of one or more lens groups being either movable or stationary. Each of the lens groups may be constituted of two or more lens elements.

In the above embodiment, the lid shaped reception unit 16 is initially separate from the main body 15. However, a single main body or casing may be provided with the camera module or camera device 13, the microphone 18, the key pad unit 19, the subsidiarykey pad unit 22, the display panel 23 and the speaker 24. In combination with this, a cover or protector as a lid is slidably secured to the main body or casing, for protecting the key pad unit 19, the display panel 23 and the like. Sliding of the cover or protector can telescope the optical system container 43 mechanically.

In the above embodiments, the electronic equipment of the invention is the cellular telephone handset. However, electronic equipment of the invention may be any suitable type in which a sliding structure is used, and an optical system is shiftable for zooming.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image pickup device comprising:
a main body;
a lid structure, slidable on a first surface of said main body between closed and open positions, positioned to lie on said first surface when in said closed position, and positioned to uncover at least part of said first surface when in said open position;
an image sensor, incorporated in said main body, for picking up an image;
a first optical system, having a first optical axis extending erectly from said first surface, for receiving object light incident thereon;
a second optical system, having a second optical axis extending substantially in parallel with said first surface, for introducing said object light to said image sensor;
a path bending optical element for introducing said object light to said second optical system by changing an optical path of said object light from said first optical system; and
an optical system container, extendable according to sliding of said lid structure, for containing said first and second optical systems and said path bending optical element, for entering said main body when said lid structure is in said closed position, to decrease an optical path length of said second optical system, and for protruding from said main body when said lid structure is in said open position, to increase said optical path length of said second optical system.

2. An image pickup device as defined in claim 1, wherein said optical system container includes:
a first barrel, supported on said lid structure, for containing said first optical system and said path bending optical element; and
a second barrel, extendable in a sliding direction, for containing said second optical system.

3. An image pickup device as defined in claim 2, wherein said first barrel includes a photographing opening, directed to an object side, for introducing said object light to said first optical system;
said lid structure is positioned opposite to said object side with respect to said main body.

4. An image pickup device as defined in claim 3, wherein said first barrel has first and second ends, said first end has said photographing opening, and said second end is secured to a surface of said lid structure opposed to said first surface.

5. An image pickup device as defined in claim 3, wherein when said lid structure is in said closed position, said first barrel is contained in said main body to block said photographing opening.

6. An image pickup device as defined in claim 2, wherein said second optical system is constituted by at least first and second movable lens elements which are positioned in respectively first and second lens holders;
further comprising a lens shifter for causing said first and second lens holders to move said first and second movable lens elements along said second optical axis.

7. An image pickup device as defined in claim 6, wherein said second barrel includes:
a stationary container sleeve disposed stationarily; and
at least one movable container sleeve, contained in said stationary container sleeve movably in said sliding direction.

8. An image pickup device as defined in claim 7, wherein said first movable lens element is contained in said movable container sleeve, and adapted to zooming.

9. An image pickup device as defined in claim 7, wherein said lens shifter includes:
first and second rods, disposed in said stationary container sleeve and said movable container sleeve along one another, each of said first and second rods having a plurality of tubes, having different diameters and connected extendably, and a screw portion formed partially thereon;
a nut portion and a sliding cutout, said nut portion being formed with a first end of said first and second lens holders, said sliding cutout being formed in a second end of said first and second lens holders, said nut portion being helically engaged with said screw portion of one of said first and second rods, said sliding cutout receiving insertion of a remaining one of said first and second rods, wherein each of said first and second rods rotate to cause said screw portion to move said first or second lens holder along said second optical axis.

10. An image pickup device as defined in claim 2, further comprising:
a lens shifter for moving said second optical system along said second optical axis;
a transmission mechanism, actuated when said lid structure is slid, for driving said lens shifter according to a direction and amount of sliding of said lid structure.

11. An image pickup device as defined in claim 2, wherein said first barrel includes a photographing opening for introducing said object light to said first optical system;
said lid structure and said photographing opening are disposed on an object side with respect to said main body.

12. An image pickup device as defined in claim 2, wherein said first barrel includes a photographing opening for introducing said object light to said first optical system;
further comprising a through hole, formed in said lid structure, opposed to said main body, for receiving insertion of said first barrel.

13. Ah image pickup device as defined in claim 2, further comprising a key pad unit, disposed on said first surface of said main body, externally operable, for inputting information.

14. An image pickup device as defined in claim 13, further comprising:
- a connector for connecting said lid structure with said main body to send a signal; and
- a display panel, incorporated in said lid structure, for displaying an image according to said signal.

15. An image pickup device as defined in claim 2, wherein said image pickup device is used in electronic portable equipment.

16. An image pickup device as defined in claim 15, wherein said electronic portable equipment is a cellular telephone handset.

17. A portable electronic equipment comprising:
- a main body;
- a lid structure, slidable on a first surface of said main body between closed and open positions, positioned to lie on said first surface when in said closed position, and positioned to uncover at least part of said first surface when in said open position;
- an image sensor, incorporated in said main body, for picking up an image;
- a first optical system, having a first optical axis extending erectly from said first surface, for receiving object light incident thereon;
- a second optical system, having a second optical axis extending substantially in parallel with said first surface, for introducing said object light to said image sensor;
- a path bending optical element for introducing said object light to said second optical system by changing an optical path of said object light from said first optical system; and
- an optical system container, extendable according to sliding of said lid structure, for containing said first and second optical systems and said path bending optical element, for entering said main body when said lid structure is in said closed position, to decrease an optical path length of said second optical system, and for protruding from said main body when said lid structure is in said open position, to increase said optical path length of said second optical system.

* * * * *